US012243376B2

(12) United States Patent
Bolling, Jr. et al.

(10) Patent No.: US 12,243,376 B2
(45) Date of Patent: Mar. 4, 2025

(54) ELECTRONIC WAGERING GAME IN WHICH JACKPOT UPGRADE SYMBOLS ARE ADDED TO ONE OR MORE REEL STRIPS

(71) Applicant: Aristocrat Technologies Australia Pty Limited, North Ryde (AU)

(72) Inventors: T. Grant Bolling, Jr., Reno, NV (US); Michael P. Casey, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/636,012

(22) Filed: Apr. 15, 2024

(65) Prior Publication Data

US 2024/0257602 A1 Aug. 1, 2024

Related U.S. Application Data

(63) Continuation of application No. 18/171,634, filed on Feb. 20, 2023, now Pat. No. 11,983,987, which is a (Continued)

(51) Int. Cl.
*G07F 17/32* (2006.01)
*G06Q 50/34* (2012.01)
(Continued)

(52) U.S. Cl.
CPC ......... *G07F 17/3213* (2013.01); *G06Q 50/34* (2013.01); *G07F 17/3258* (2013.01); *G07F 17/34* (2013.01); *G07F 17/42* (2013.01)

(58) Field of Classification Search
CPC ... G07F 17/3213; G07F 17/3258; G07F 17/34
See application file for complete search history.

(56) References Cited

U.S. PATENT DOCUMENTS 7,014,559 B1 3/2006 Fong
7,601,060 B2 10/2009 Baerlocher
(Continued)

FOREIGN PATENT DOCUMENTS

AU 2011205196 B2 8/2014

OTHER PUBLICATIONS

Australian Examination Report No. 1 issued in App. No. AU2021225256, dated Nov. 17, 2022, 3 pages.
(Continued)

*Primary Examiner* — Chase E Leichliter
(74) *Attorney, Agent, or Firm* — Armstrong Teasdale LLP

(57) ABSTRACT

An electronic gaming system conducts a reel-based electronic wagering game, in which jackpot upgrade symbols are added to one or more reel strips based on the occurrence of one or more reel upgrade symbols in the wagering game. In the exemplary embodiment, jackpot upgrade symbols are added to a third reel strip based on the occurrence of one or more reel upgrade symbols on a first reel strip, and to a fifth reel strip based on the occurrence of one or more reel upgrade symbols on the third reel strip. In addition, jackpot upgrade symbols are added to the first and third reel strips to replace the one or more reel upgrade symbols occurring thereon.

20 Claims, 7 Drawing Sheets

Related U.S. Application Data continuation of application No. 17/061,198, filed on Oct. 1, 2020, now Pat. No. 11,600,133, which is a continuation of application No. 15/925,382, filed on Mar. 19, 2018, now Pat. No. 10,796,521.

(60) Provisional application No. 62/536,272, filed on Jul. 24, 2017.

(51) Int. Cl.
*G07F 17/34* (2006.01)
*G07F 17/42* (2006.01)

(56) References Cited

U.S. PATENT DOCUMENTS 7,677,971 B2 3/2010 Baerlocher
8,348,754 B2 1/2013 Jackson
8,360,851 B2 1/2013 Aoki
8,388,435 B2 3/2013 Anderson
9,171,423 B2 10/2015 O'Halloran
10,796,521 B2* 10/2020 Bolling, Jr. ......... G07F 17/3258
11,600,133 B2* 3/2023 Bolling, Jr. ............. G07F 17/34
2007/0105611 A1* 5/2007 O'Halloran ......... G07F 17/3244 463/16
2007/0178959 A1* 8/2007 Halprin ................... G07F 17/34 463/20
2009/0054129 A1* 2/2009 Yoshimura .............. G07F 17/32 463/20
2009/0131150 A1* 5/2009 Iverson ............... G07F 17/3211 463/20
2009/0286592 A1* 11/2009 Vann ....................... G07F 17/34 463/20
2010/0190543 A1* 7/2010 Englman ................. G07F 17/34 463/20
2011/0098100 A1 4/2011 Tsombanidis
2012/0034967 A1* 2/2012 Owen ..................... G07F 17/34 463/31
2012/0172106 A1* 7/2012 Caputo ............... G07F 17/3244 463/20
2012/0295689 A1 11/2012 Owen
2013/0079101 A1 3/2013 Nicely
2014/0221080 A1 8/2014 Cohen
2014/0357342 A1 12/2014 Elias
2015/0356813 A1* 12/2015 Mead ....................... G07F 17/34 463/20
2016/0133087 A1 5/2016 Cong
2017/0316641 A1 11/2017 Wortmann
2018/0053379 A1 2/2018 Meyer
2019/0026976 A1* 1/2019 Casey ................. G07F 17/3258
2019/0026977 A1* 1/2019 Bolling, Jr. ......... G07F 17/3213
2021/0019985 A1* 1/2021 Bolling, Jr. ......... G07F 17/3213
2023/0206718 A1* 6/2023 Bolling, Jr. ............. G07F 17/34 463/30
2024/0257602 A1* 8/2024 Bolling, Jr. ............. G07F 17/34

OTHER PUBLICATIONS

Australian Examination Report No. 1 for App. No. AU2019275667, dated Sep. 4, 2020, 3 pages.
Office Action (Non-Final Rejection) dated Nov. 12, 2021 for U.S. Appl. No. 17/061,198 (pp. 1-16).
Office Action (Non-Final Rejection) dated Jan. 21, 2022 for U.S. Appl. No. 17/061,183 (pp. 1-5).
Office Action (Notice of Allowance and Fees Due (PTOL-85)) dated Mar. 31, 2022 for U.S. Appl. No. 17/061,183 (pp. 1-7).
Office Action (Final Rejection) dated May 12, 2022 for U.S. Appl. No. 17/061,198 (pp. 1-16).
Office Action (Non-Final Rejection) dated Sep. 2, 2022 for U.S. Appl. No. 17/061,198 (pp. 1-10).
Office Action (Notice of Allowance and Fees Due (PTOL-85)) dated Dec. 9, 2022 for U.S. Appl. No. 17/061,198 (pp. 1-8).
Office Action (Notice of Allowance and Fees Due (PTOL-85)) dated Jan. 30, 2023 for U.S. Appl. No. 17/748,822 (pp. 1-12).
Notice of Allowance dated Jun. 24, 2020 for U.S. Appl. No. 15/925,382 (pp. 1-10).
Notice of Allowance dated Jul. 14, 2020 for U.S. Appl. No. 16/122,548 (pp. 1-12).
Office Action (Non-Final Rejection) dated Aug. 17, 2023 for U.S. Appl. No. 18/171,634 (pp. 1-17).
Office Action (Final Rejection) dated Dec. 20, 2023 for U.S. Appl. No. 18/171,634 (pp. 1-13).
Office Action (Notice of Allowance and Fees Due (PTOL-85)) dated Feb. 27, 2024 for U.S. Appl. No. 18/171,634 (pp. 1-8).
Notice of Allowance dated Apr. 2, 2024 for U.S. Appl. No. 18/305,226 (pp. 1-8).

* cited by examiner

| | Reel Strips | | | | |
|---|---|---|---|---|---|
| index | 1 | 2 | 3 | 4 | 5 |
| 0 | PIC_2 | SC_F | STAK3 | A_04 | A_03 |
| 1 | PIC_1 | PIC_1 | A_03 | PIC_3 | STAK2 |
| 2 | SC_P1 | PIC_3 | PIC_3 | A_02 | A_04 |
| 3 | PIC_2 | PIC_2 | STAK1 | PIC_3 | A_02 |
| 4 | A_04 | PIC_2 | PIC_1 | PIC_2 | STAK1 |
| 5 | A_04 | A_02 | PIC_2 | A_05 | A_04 |
| 6 | A_01 | A_01 | STAK2 | PIC_1 | PIC_2 |
| 7 | PIC_3 | A_03 | A_05 | PIC_1 | A_04 |
| 8 | A_03 | A_04 | PIC_1 | SC_F | PIC_2 |
| 9 | PIC_2 | SC_F | STAK1 | A_04 | A_02 |
| 10 | A_05 | A_05 | SC_P1 | A_05 | PIC_3 |
| 11 | PIC_1 | A_04 | PIC_1 | A_01 | A_05 |
| 12 | A_05 | A_01 | A_02 | SC_F | A_02 |
| 13 | A_01 | PIC_1 | STAK3 | A_03 | PIC_1 |
| 14 | PIC_3 | A_01 | PIC_2 | PIC_2 | STAK2 |
| 15 | A_05 | PIC_2 | PIC_3 | A_03 | PIC_2 |
| 16 | A_04 | A_01 | STAK3 | PIC_1 | A_03 |
| 17 | A_02 | A_04 | PIC_2 | PIC_2 | A_03 |
| 18 | A_05 | A_02 | PIC_3 | A_04 | A_02 |
| 19 | A_04 | SC_F | STAK1 | SC_F | A_01 |
| 20 | PIC_1 | PIC_1 | A_05 | A_03 | PIC_2 |
| 21 | PIC_3 | A_05 | A_01 | A_04 | STAK2 |
| 22 | PIC_2 | PIC_2 | STAK2 | PIC_3 | PIC_1 |
| 23 | SC_P2 | A_03 | PIC_1 | A_01 | A_03 |
| 24 | A_01 | A_02 | A_01 | A_03 | PIC_3 |
| 25 | A_05 | A_02 | STAK1 | PIC_2 | A_01 |
| 26 | PIC_2 | A_05 | A_03 | PIC_3 | A_01 |
| 27 | A_04 | PIC_1 | PIC_3 | PIC_1 | SC_P |
| 28 | SC_P3 | SC_F | SC_P2 | PIC_3 | PIC_1 |

FIG. 4

ELECTRONIC WAGERING GAME IN WHICH JACKPOT UPGRADE SYMBOLS ARE ADDED TO ONE OR MORE REEL STRIPS

CROSS REFERENCE TO RELATED APPLICATIONS

This application is a continuation of and claims priority to U.S. patent application Ser. No. 18/171,634, filed Feb. 20, 2023, which is a continuation of U.S. patent application Ser. No. 17/061,198, now U.S. Pat. No. 11,600,133, filed Oct. 1, 2020, which is a continuation of U.S. patent application Ser. No. 15/925,382, now U.S. Pat. No. 10,796,521, filed Mar. 19, 2018, which claims the benefit of U.S. Provisional Patent Application No. 62/536,272, filed Jul. 24, 2017, which are hereby incorporated by reference herein in their entireties.

TECHNICAL FIELD

The field of disclosure relates generally to electronic gaming, and more particularly to an electronic bonus game, which may be triggered from a primary or base game, and in which jackpot upgrade symbols are added to one or more reel strips, such as, for example, based on the occurrence of one or more reel upgrade symbols in the bonus game.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards form any winning outcomes are typically added back to the credit balance and can be provided to the player upon completion of a gaming session or when the player wants to “cash out.”

Slot games are often displayed to the player in the form of various symbols arranged in a row-by-column grid, or “matrix.” Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a “pay-table” that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

BRIEF DESCRIPTION

In one aspect, an electronic gaming machine configured to trigger a jackpot feature during player of a wagering game is provided. The electronic gaming machine includes a display configured to display the wagering game, a player input interface configured to receive a player input, a credit input mechanism configured to receive a credit wager, and a game controller configured to perform operations comprising: (i) initiating the wagering game by spinning a plurality of reel strips, wherein each reel strip comprises a plurality of symbols; (ii) displaying the symbols from the spinning plurality of reel strips in a plurality of corresponding display positions on the display; (iii) stopping a first reel strip of the plurality of reel strips, whereby symbols from the first reel strip are stopped and displayed in the plurality of corresponding display positions; (iv) determining that a first reel upgrade symbol is displayed from the first reel strip; (v) replacing at least one replaceable symbol on at least one of the spinning plurality of reel strips with a first jackpot upgrade symbol; (vi) stopping at least one other reel strip of the plurality of reel strips, whereby symbols from the other reel strip are stopped and displayed in the plurality of corresponding display positions; (vii) determining that a second reel upgrade symbol is displayed from the at least one other reel strip; (viii) replacing at least one replaceable symbol on at least one of the spinning plurality of reel strips with a second jackpot upgrade symbol; (ix) stopping the remaining reel strips, whereby symbols from the remaining reel strips are stopped and displayed in the plurality of corresponding display positions; (x) evaluating the symbols displayed from each of the plurality of reel strips; and (xi) triggering a jackpot feature if a number of jackpot upgrade symbols displayed from each of the plurality of reel strips exceeds a threshold number of jackpot upgrade symbols.

In another aspect, method of triggering a jackpot feature during play of a wagering game on an electronic gaming machine is provided. The method is implemented using a gaming machine that includes a display configured to display the wagering game, a player input interface, and a credit input mechanism configured to establish a credit balance that is increasable and decreasable based on wagering activity The method includes the steps of: (i) initiating the wagering game by spinning a plurality of reel strips, wherein each reel strip comprises a plurality of symbols; (ii) displaying the symbols from the spinning plurality of reel strips in a plurality of corresponding display positions on the display; (iii) stopping a first reel strip of the plurality of reel strips, whereby symbols from the first reel strip are stopped and displayed in the plurality of corresponding display positions; (iv) determining that a first reel upgrade symbol is displayed from the first reel strip; (v) replacing at least one replaceable symbol on at least one of the spinning plurality of reel strips with a first jackpot upgrade symbol; (vi) stopping at least one other reel strip of the plurality of reel strips, whereby symbols from the other reel strip are stopped and displayed in the plurality of corresponding display positions; (vii) determining that a second reel upgrade symbol is displayed from the at least one other reel strip; (viii) replacing at least one replaceable symbol on at least one of the spinning plurality of reel strips with a second jackpot upgrade symbol; (ix) stopping the remaining reel strips, whereby symbols from the remaining reel strips are stopped and displayed in the plurality of corresponding display positions; (x) evaluating the symbols displayed from each of the plurality of reel strips; and (xi) triggering a jackpot feature if a number of jackpot upgrade symbols displayed from each of the plurality of reel strips exceeds a threshold number of jackpot upgrade symbols.

In yet another aspect, an article of manufacture is provided. The article includes a non-transitory, tangible, computer readable storage medium having instructions stored thereon that, in response to execution by a game controller configured for to trigger a jackpot feature during play of a wagering game, cause the game controller to perform operations comprising: (i) initiating the wagering game by spinning a plurality of reel strips, wherein each reel strip comprises a plurality of symbols; (ii) displaying the symbols from the spinning plurality of reel strips in a plurality of corresponding display positions on the display; (iii) stopping a first reel strip of the plurality of reel strips, whereby symbols from the first reel strip are stopped and displayed in the plurality of corresponding display positions; (iv) determining that a first reel upgrade symbol is displayed from the first reel strip; (v) replacing at least one replaceable symbol on at least one of the spinning plurality of reel strips with a first jackpot upgrade symbol; (vi) stopping at least one other reel strip of the plurality of reel strips, whereby symbols from the other reel strip are stopped and displayed in the plurality of corresponding display positions; (vii) determining that a second reel upgrade symbol is displayed from the at least one other reel strip; (viii) replacing at least one replaceable symbol on at least one of the spinning plurality of reel strips with a second jackpot upgrade symbol; (ix) stopping the remaining reel strips, whereby symbols from the remaining reel strips are stopped and displayed in the plurality of corresponding display positions; (x) evaluating the symbols displayed from each of the plurality of reel strips; and (xi) triggering a jackpot feature if a number of jackpot upgrade symbols displayed from each of the plurality of reel strips exceeds a threshold number of jackpot upgrade symbols.

BRIEF DESCRIPTION OF THE DRAWINGS

An example embodiment of the subject matter disclosed will now be described with reference to the accompanying drawings.

FIG. 4 is a schematic diagram of an exemplary plurality of reel strips configured for use with the electronic bonus game described at FIG. 3;

DETAILED DESCRIPTION

Embodiments of the gaming systems, gaming devices, and methods described herein provide an electronic gaming machine (EGM) on which a reel-based electronic wagering game, or slot game, is conducted. More particularly, the EGM conducts a bonus game, in which jackpot upgrade symbols are added to one or more reel strips, such as, for example, based on the occurrence of one or more reel upgrade symbols in the bonus game. In the exemplary embodiment, jackpot upgrade symbols are added to a third reel strip based on the occurrence of one or more reel upgrade symbols on a first reel strip, and to a fifth reel strip based on the occurrence of one or more reel upgrade symbols on the third reel strip. In addition, jackpot upgrade symbols are added to the first and third reel strips to replace the one or more reel upgrade symbols occurring thereon.

Figure 1:
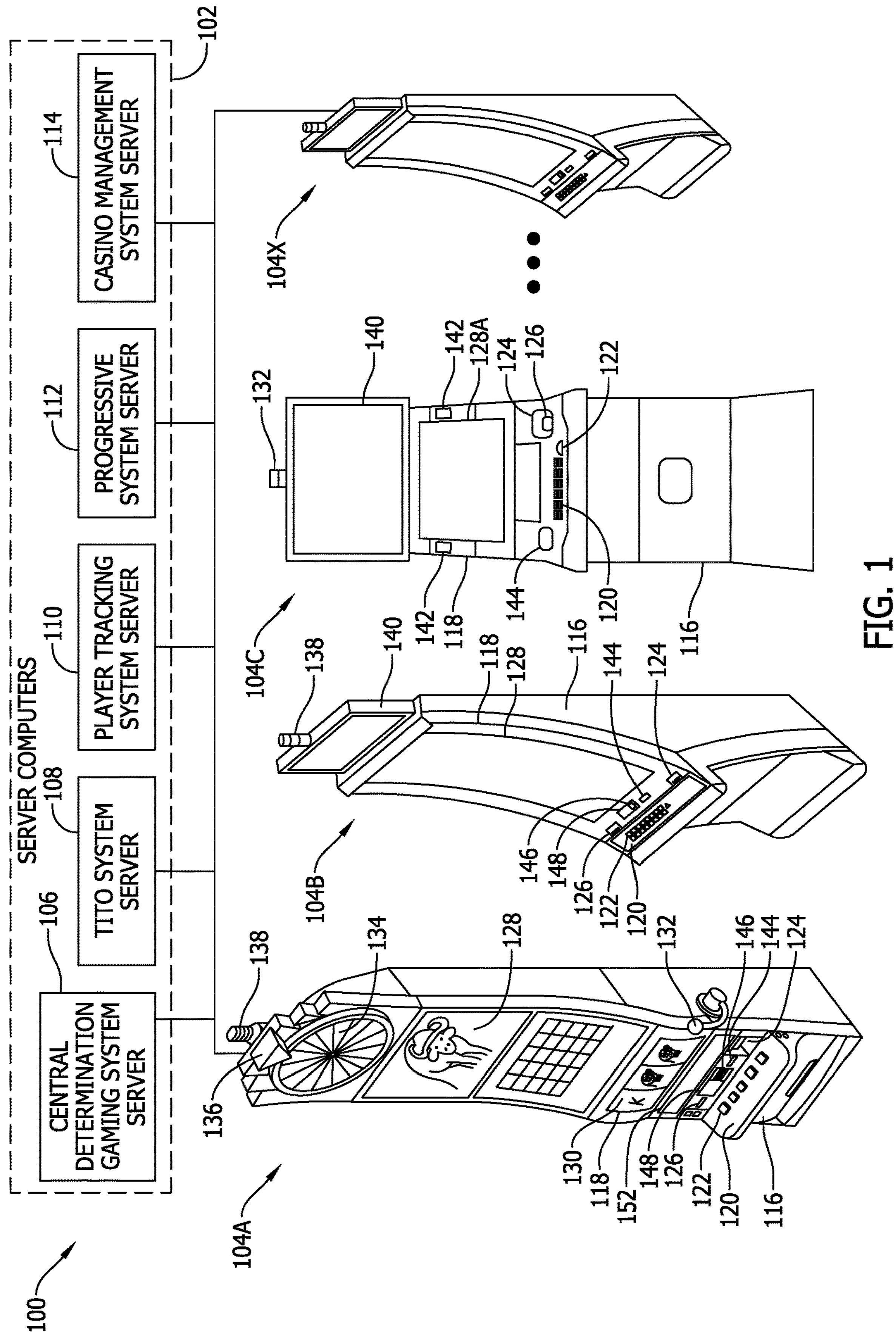
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed thereon. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
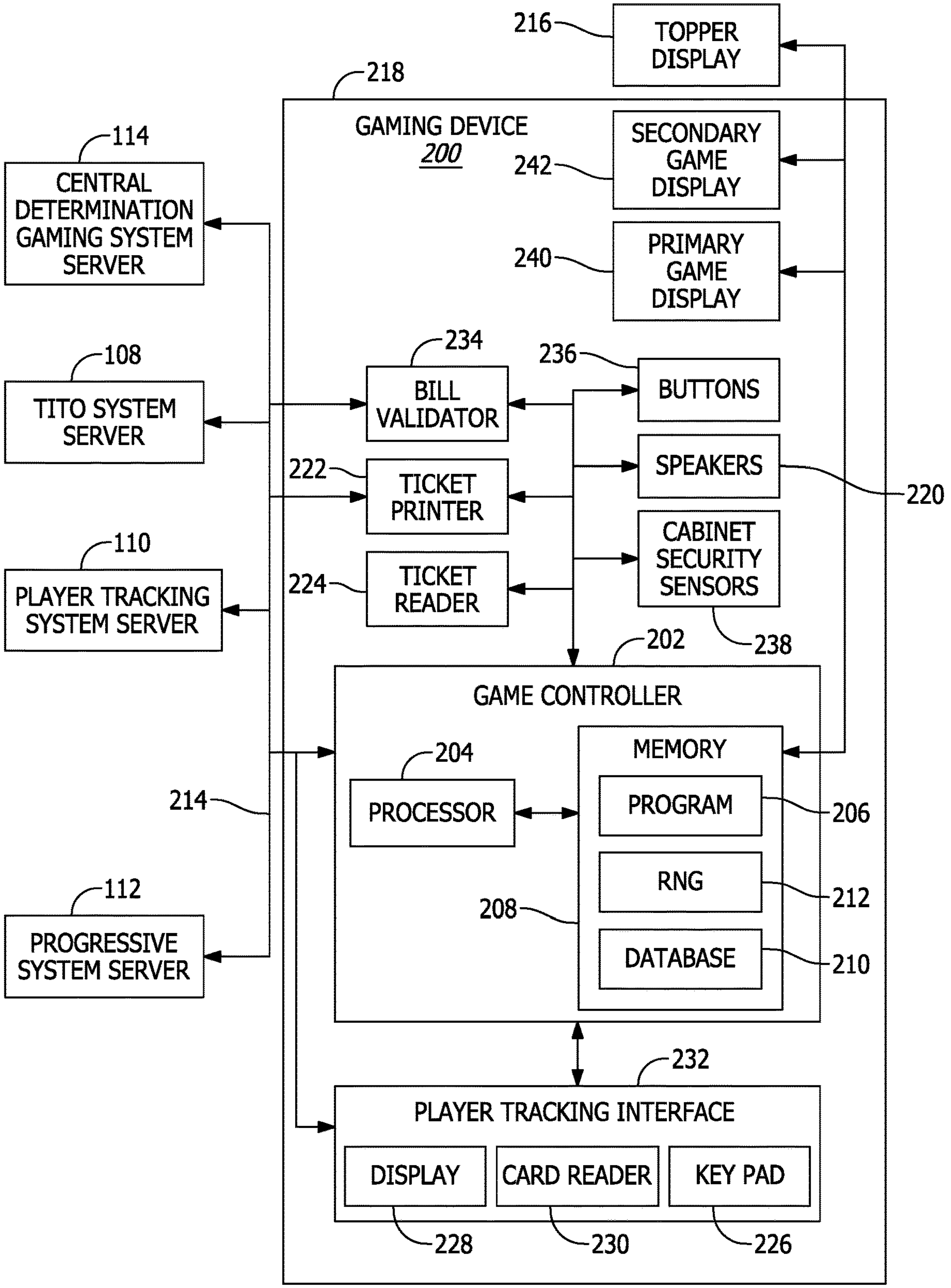
FIG. 2 is a block diagram of an exemplary electronic gaming device.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numerals identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator 124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

As described below, and by way of introduction, an EGM, such as any of EGMS 104A-104X, may conduct a bonus game. During the bonus game, each of a plurality of five reel strips may be made to spin concurrently. The first and third reel strips (moving in order from left to right) may include one or more reel upgrade (or "Reel Upgrade") symbols. The first reel strip may be stopped and evaluated to determine whether such a "Reel Upgrade" symbol has landed. If it is determined that a "Reel Upgrade" symbol has landed on the first reel strip, an "Up Arrow" symbol may displayed on the third reel strip to indicate that one or more "Jackpot Upgrade" symbols are being added to the third reel strip.

Specifically, the third reel strip may include one or more replaceable symbols, which are configured to be replaced by jackpot upgrade (or "Jackpot Upgrade") symbols. A player may not know which symbols are replaceable symbols by looking at the third reel strip. Nevertheless, the third reel strip may include these replaceable symbols, and when an "Up Arrow" symbol is shown, it may indicate that one or more replaceable symbols are being replaced on the third reel strip by "Jackpot Upgrade" symbols. Note also that the player may not see where these "Jackpot Upgrade" symbols are placed on the third reel strip; however the purpose of the "Up Arrow" is to signify that one or more "Jackpot Upgrade" symbols are being added to the third reel strip.

Next, the second and third reel strips may be stopped, and the third reel strip may be evaluated to determine whether a "Reel Upgrade" symbol has landed on the third reel strip. Simultaneously, the "Reel Upgrade" symbol that previously landed on the first reel strip may be replaced by an "Up Arrow" symbol to indicate that this "Reel Upgrade" symbol on the first reel strip is being replaced by a "Jackpot Upgrade" symbol.

In addition, if it is determined that a "Reel Upgrade" symbol has landed on the third reel strip, an "Up Arrow" symbol may be displayed on the fifth reel strip to indicate that one or more "Jackpot Upgrade" symbols are being added to the fifth reel strip. Specifically, the fifth reel strip may (like the third reel strip) include one or more replaceable symbols, which are configured to be replaced by "Jackpot Upgrade" symbols. Again, a player may not know which symbols are replaceable symbols by looking at the fifth reel strip. Nevertheless, the fifth reel strip may include these replaceable symbols, and when an "Up Arrow" symbol is shown on the fifth reel strip, it may indicate that one or more replaceable symbols are being replaced on the fifth reel strip by "Jackpot Upgrade" symbols. Note also that the player may not see where these "Jackpot Upgrade" symbols are added to the fifth reel strip. However, the purpose of the "Up Arrow" symbol on the fifth reel strip is to signify that one or more such "Jackpot Upgrade" symbols are being added to the fifth reel strip.

Next, the fourth and fifth reel strips may be stopped, and the "Up Arrow" symbols that were placed on the first and third reel strips may finally be visibly replaced by "Jackpot Upgrade" symbols. In addition, it may be determined whether one of the "Jackpot Upgrade" symbols that were added to the fifth reel strip has landed on the fifth reel strip. If three "Jackpot Upgrade" symbols have landed across the first reel strip, the third reel strip, and the fifth reel strip, respectively, a jackpot game, such as a wheel-based jackpot game, may be initiated. Thus, in summary, the third and fifth reel strips include replaceable symbols, which may not be visibly indicated to a player as such, and which may appear, from a player perspective, as regular symbols. When a "Reel Upgrade" symbol lands on the first reel strip, one or more replaceable symbols on the third reel strip are replaced by "Jackpot Upgrade" symbols, and an "Up Arrow" may be shown to indicate that this is happening on the third reel strip. Similarly, when a "Reel Upgrade" symbol lands on the third reel strip, one or more replaceable symbols on the fifth reel strip are replaced by "Jackpot Upgrade" symbols, and an "Up Arrow" may be shown to indicate that this is happening on the fifth reel strip. In addition, the "Reel Upgrade" symbols that landed on the first and third reel strips may be replaced by "Jackpot Upgrade" symbols as well, and "Up Arrow" symbols may be shown on the first and third reel strips to indicate that this is happening. Finally, the "Up Arrow" symbols on the first and third reel strips are visibly replaced by "Jackpot Upgrade" symbols, and the first, third, and fifth reel strips are evaluated to determine whether to trigger a bonus game.

Figure 3:
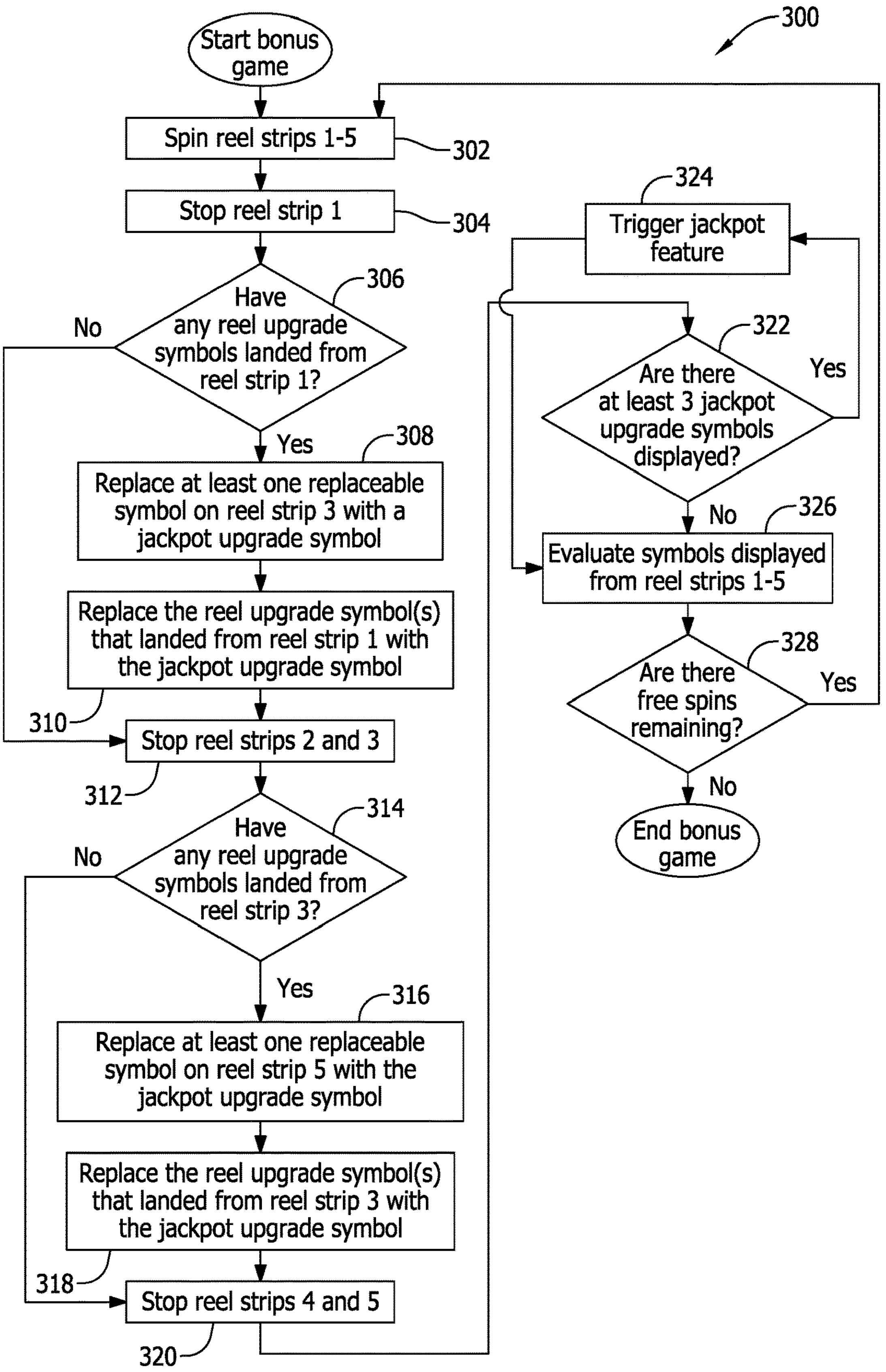
FIG. 3 is a flowchart illustrating an exemplary method of conducting an electronic bonus game on an electronic gaming machine.

FIG. 3 is a flowchart 300 illustrating an exemplary method of conducting an electronic bonus game on an electronic gaming machine, such as any of gaming devices 104A-104X and 200. Accordingly, in the exemplary embodiment, processor 204 may initiate the bonus game by spinning a plurality of reel strips displayed on primary game display 240 (step 302). In particular, the bonus game may include a plurality of free spins, such as, for example, a number of free spins in the range of ten to one-hundred-and-twenty free spins. These free spins may be triggered from a primary or base game, such as, for example, in response to a trigger condition occurring in the primary game. During each free spin, the plurality of reel strips (e.g., reel strips 402-410 as described below with respect to FIG. 4), may be spun or re-spun. In addition, as described below, primary game display 240 and/or secondary game display 242 may display any suitable number of reel strips, such as, for example, between three and five reel strips.

Figure 5:
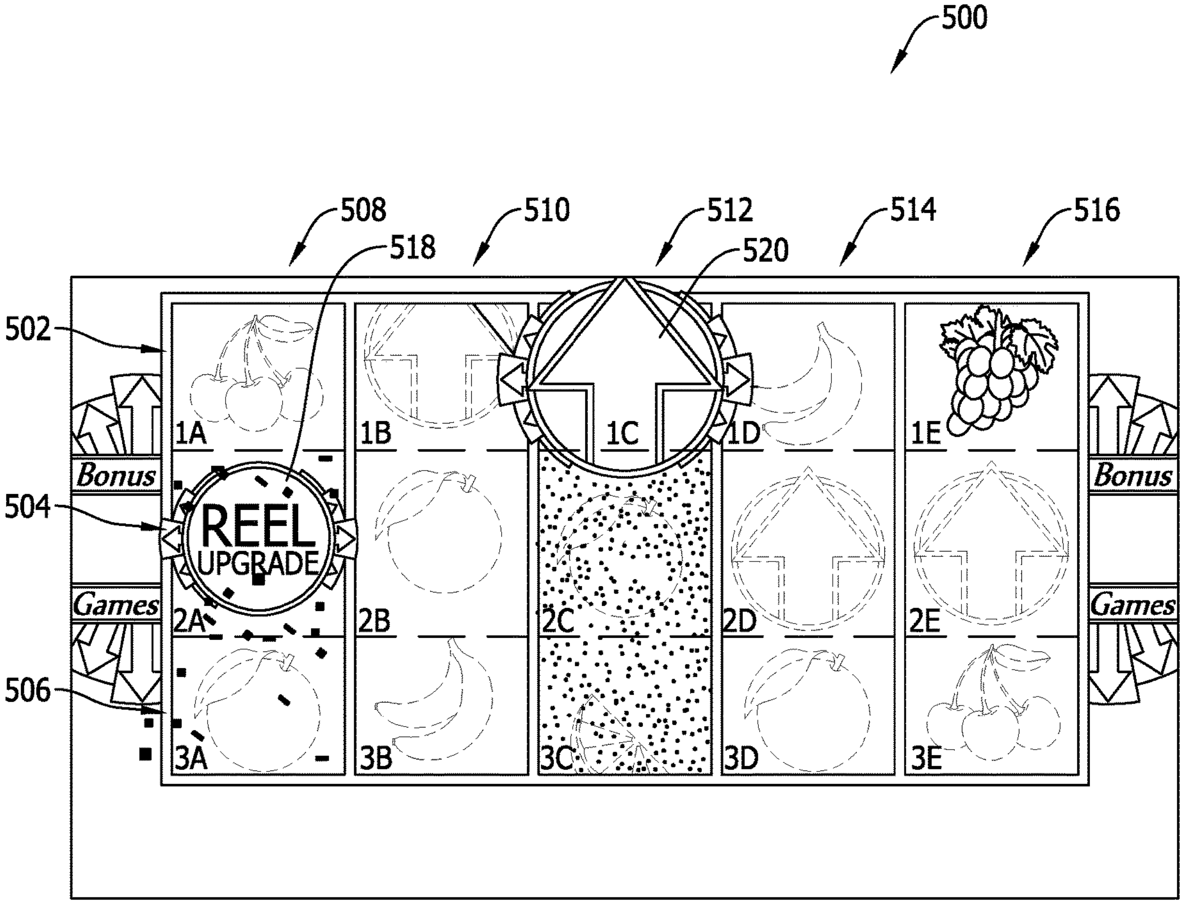
FIG. 5 is a schematic diagram of an exemplary game display of the EGMs shown in FIGS. 1 and 2 during the bonus game described at FIG. 3, and illustrating the occurrence of a first reel upgrade.

FIG. 4 is a schematic diagram 400 of an exemplary plurality of reel strips 402-410 configured for use with the electronic bonus game described at FIG. 3. As shown, a plurality of reel strips, such as a first reel strip 402, a second reel strip 404, a third reel strip 406, a fourth reel strip 408, and a fifth reel strip 410 are shown. Each reel strip 402-410 includes a plurality of symbols, each configured for display, as described below, at a symbol display position of a game area 500 (as shown at FIG. 5). For example, first reel strip 402 includes a first symbol 412 (PIC_2), a second symbol 414 (PIC_1), and so on. In some embodiments, a reel strip 402-410 may include hundreds or thousands of such symbols.

Further, as shown, first reel strip 402 may include a plurality of reel upgrade symbols, such as a first reel upgrade symbol 418 (SC_P1), a second reel upgrade symbol 420 (SC_P2), and a third reel upgrade symbol 422 (SC_P3). Likewise, third reel strip 406 may include a plurality of reel upgrade symbols, such as a first reel upgrade symbol 424 (SC_P1) and a second reel upgrade symbol 426 (SC_P2). In general, reel upgrade symbols bear the following notation (not visible to players), or are associated with one of the following identifiers: "SC_P1," "SC_P2," or "SC_P3." In addition, although only five reel upgrade symbols 418-426 are shown, it will be appreciated that any suitable number of reel upgrade symbols may be included on reel strips 402-410. In addition, although reel upgrade symbols 418-426 are only shown on first reel strip 402 and third reel strip 408, in various embodiments, reel upgrade symbols may appear on any of reel strips 402-410. However, in the exemplary embodiment, reel upgrade symbols do not appear on reel strips other than first reel strip 402 and third reel strip 408. In addition, as those of skill will appreciate, although first reel strip 402 and third reel strip 406 may include a plurality of reel upgrade symbols, these symbols may not be displayed unless the reel strips are stopped, during game play, such that one of the reel upgrade symbols "lands" or is visible.

In addition, and in the exemplary embodiment, third reel strip 406 may include a plurality of replaceable symbols, such as a first replaceable symbol 428 (STAK3), a second replaceable symbol 430 (STAK1), a third replaceable symbol 432 (STAK2), a fourth replaceable symbol 434 (STAK1), a fifth replaceable symbol 436 (STAK3), a sixth replaceable symbol 438 (STAK3), a seventh replaceable symbol 440 (STAK1), an eighth replaceable symbol 442 (STAK2), and a ninth replaceable symbol 444 (STAK1). In general, replaceable symbols bear the following notation, or are associated with one of the following identifiers: "STAK1," "STAK2," or "STAK3." Not that these replaceable symbols are not necessarily known by players to be replaceable symbols. In other words, they may simply appear, from a player perspective, as regular symbols.

Similarly, fifth reel strip 410 may include a plurality of replaceable symbols, such as a first replaceable symbol 446 (STAK2), a second replaceable symbol 448 (STAK1), a third replaceable symbol 450 (STAK2), and a fourth replaceable symbol 452 (STAK2). Although only thirteen replaceable symbols 428-452 are shown, it will be appreciated that any suitable number of replaceable symbols may be included on reel strips 402-410. In addition, although replaceable symbols 428-452 are only shown on third reel strip 406 and fifth reel strip 410, in various embodiments, replaceable symbols may appear on any of reel strips 402-410. Here again, these replaceable symbols are not necessarily known by players to be replaceable symbols but may appear, from a player perspective, as regular symbols.

As described in greater detail below, computer memory 208 (e.g., database 210) may store an association between one or more reel upgrade symbols 418-426 and one or more replaceable symbols 428-452, such that the occurrence of a reel upgrade symbol 418-426 during gameplay may trigger replacement of one or more associated replaceable symbols 428-452 with one or more jackpot upgrade symbols. Specifically, all SC_P1 reel upgrade symbols on first reel strip 402 may be associated with all STAK1 replaceable symbols on third reel strip 406, such that the occurrence of an SC_P1 reel upgrade symbol on first reel strip 402 causes all STAK1 replaceable symbols on third reel strip 406 to be replaced with a jackpot upgrade symbol.

Similarly, all SC_P2 reel upgrade symbols on first reel strip 402 may be associated with all STAK2 replaceable symbols on third reel strip 406, and all SC_P3 reel upgrade symbols on first reel strip 402 may be associated with all STAK 3 replaceable symbols on third reel strip 406. Likewise, all SC_P1 reel upgrade symbols on third reel strip 406 may be associated with all STAK1 replaceable symbols on fifth reel strip 410, all SC_P2 reel upgrade symbols on third reel strip 406 may be associated with all STAK2 replaceable symbols on fifth reel strip 410, and all SC_P3 reel upgrade symbols (if any) on third reel strip 406 may be associated with all STAK3 replaceable symbols on fifth reel strip 410. Thus, the occurrence of an SC_P1, SC_P2, or SC_P3 reel upgrade symbol on first reel strip 402 or third reel strip 406 may cause a corresponding STAK1, STAK2, or STAK3 replaceable symbol, respectively, to be replaced on third reel strip 406 and/or fifth reel strip 410 with a jackpot upgrade symbol.

FIG. 5 is a schematic diagram of an exemplary game display 500 of gaming devices 104A-104X and 200 during the bonus game described at FIG. 3. As shown, primary game display 240 may display a game area 500. In an alternative embodiment, secondary game display 242 displays game area 500. In either case, game area 500 simulates a plurality of mechanical reels (e.g., game area 500 depicts a plurality of so-called "virtual reels"), and includes a matrix of rows 502, 504, 506 and columns 508, 510, 512, 514, and 516. In various embodiments, any suitable number of columns and rows may be displayed. Accordingly, in the exemplary embodiment, a plurality of symbol display positions, such as fifteen symbol display positions, are included in the matrix of rows 502-506 and columns 508-516. Each symbol display position is designated by a row number (e.g., 1, 2, and 3) and a column letter (e.g., A, B, C, D, and E). For example, the upper-left-most symbol display position, occurring at the intersection of row 502 and column 508, is designated by symbol display position "1A."

As described in additional detail below, during the bonus game, a plurality of symbols from each reel strip 402-410 are displayed in a respective column 508-516. Specifically, three symbols are concurrently displayed from each reel strip 402-410 at a respective symbol display position of a respective column 508-516. Moreover, as each reel strip 402-410 is spun (or animated to give the appearance of being spun), different symbols from each reel strip 402-410 are displayed in each column 508-516. Specifically, groups of three adjacent symbols from each reel strip 402-410 are sequentially displayed in each of the three symbol display positions of columns 508-516, such that reel strips 402-410 appear to spin within a respective column 508-516 of game area 500.

Returning now to FIG. 3, as described above, processor 204 may initiate the wagering game by spinning reel strips 402-410, such as in response to a wager (or "bet") placed by a player (step 302). Next, processor 204 may "halt" or "stop" the animation of first reel strip 402, such as based upon a random number generated by RNG 212 (step 304). Specifically, processor 204 may receive a random number from RNG 212, and the random number may be used by processor 204 to determine a plurality of symbols to display in first column 508 from first reel strip 402. Accordingly, first reel strip 402 may appear to halt or stop, and three symbols from first reel strip 402 may be displayed in three symbol display positions of first column 508.

Processor 204 may in addition, determine whether any reel upgrade symbols, such as reel upgrade symbols 418-422, are displayed (or have "landed") in a symbol display position of first column 508 (step 306). As used herein, a symbol may be referred to as having "landed" when the reel strip from which the symbol is selected has stopped after being spun, such that the symbol is displayed in a symbol display position. Specifically, processor 204 may determine whether any SC_P1, SC_P2, and/or SC_P3 reel upgrade symbols have landed from first reel strip 402 in a symbol display position of column 508. If at least one reel upgrade symbol 418-422 is displayed, processor 204 may replace at least one replaceable symbol 428-444 on third reel strip 406 with a jackpot upgrade symbol (step 308).

More particularly, in the exemplary embodiment, if an SC_P1 reel upgrade symbol has landed on first reel strip 402, processor 204 replaces all STAK1 replaceable symbols on third reel strip 406 with a jackpot upgrade symbol. Likewise, if an SC_P2 reel upgrade symbol has landed on first reel strip 402, processor 204 replaces all STAK2 replaceable symbols on third reel strip 406 with a jackpot upgrade symbol, and if an SC_P3 reel upgrade symbol has landed on first reel strip 402, processor 204 replaces all STAK3 replaceable symbols on third reel strip 406 with a jackpot upgrade symbol. Thus, the occurrence of a reel upgrade symbol on first reel strip 402 causes a "reel upgrade" of third reel strip 406, in that all of the replaceable symbols corresponding to the displayed reel upgrade symbol are replaced or upgraded with a jackpot upgrade symbol. In at least some embodiments, and as described herein, an up arrow symbol may be temporarily displayed on a reel strip while it is being upgraded with one or more jackpot upgrade symbols.

In addition, processor 204 replaces the reel upgrade symbol on first reel strip 402 that landed on first reel strip 402 with a jackpot upgrade symbol (step 310). For example, if an SC_P1 reel upgrade symbol lands on first reel strip 402, the SC_P1 reel upgrade symbol is replaced by a jackpot upgrade symbol. Similarly, if an SC_P2 reel upgrade symbol lands on first reel strip 402, the SC_P2 reel upgrade symbol is replaced by a jackpot upgrade symbol, and if an SC_P3 reel upgrade symbol lands on first reel strip 402, the SC_P3 reel upgrade symbol is replaced by a jackpot upgrade symbol. Thus, a "reel upgrade" is also performed on first reel strip 402 when a reel upgrade symbol lands thereon. In at least some embodiments, and as described herein, an up arrow symbol may be temporarily displayed on a reel strip while it is being upgraded with one or more jackpot upgrade symbols.

Once jackpot upgrade symbols have been added to first reel strip 402 and third reel strip 406, as described above, processor 204 may stop second reel strip 404 and third reel strip 406 (step 312). In addition, if at step 306, processor 204 determines that no reel upgrade symbols have landed on first reel strip 402, processor 204 may simply stop second reel strip 404 and third reel strip 406 without adding jackpot upgrade symbols to first reel strip 402 and/or third reel strip 406.

Processor 204 may in addition, determine whether any reel upgrade symbols, such as reel upgrade symbols 424 or 426, are displayed, or have landed, in a symbol display position of third column 512 (step 314). Specifically, processor 204 may determine whether any SC_P1, SC_P2, and/or SC_P3 reel upgrade symbols have landed from third reel strip 406 in a symbol display position of third column 512. In addition, although third reel strip 406 only includes one SC_P1 and one SC_P2 reel upgrade symbol in the illustrated embodiment, it will be appreciated that third reel strip 406 may include any suitable number and/or variety of reel upgrade symbols. Moreover, if at least one reel upgrade symbol 424 or 426 is displayed, processor 204 may replace at least one replaceable symbol 446-452 on fifth reel strip 410 with a jackpot upgrade symbol (step 316).

More particularly, in the exemplary embodiment, if an SC_P1 reel upgrade symbol has landed on third reel strip 406, processor 204 replaces all STAK1 replaceable symbols on fifth reel strip 410 with a jackpot upgrade symbol. Likewise, if an SC_P2 reel upgrade symbol has landed on third reel strip 406, processor 204 replaces all STAK2 replaceable symbols on fifth reel strip 410 with a jackpot upgrade symbol, and if an SC_P3 reel upgrade symbol has landed on third reel strip 406, processor 204 replaces all STAK3 replaceable symbols on fifth reel strip 410 with a jackpot upgrade symbol. Thus, the occurrence of a reel upgrade symbol on third reel strip 406 causes a "reel upgrade" of fifth reel strip 410, in that all of the replaceable symbols on fifth reel strip 410 corresponding to the displayed reel upgrade symbol on third reel strip 406 are replaced or upgraded with a jackpot upgrade symbol on fifth reel strip 410. In at least some embodiments, and as described herein, an up arrow symbol may be temporarily displayed on a reel strip while it is being upgraded with one or more jackpot upgrade symbols.

In addition, processor 204 replaces the reel upgrade symbol on third reel strip 406 that landed on third reel strip 406 with a jackpot upgrade symbol (step 318). For example, if an SC_P1 reel upgrade symbol lands on third reel strip 406, the SC_P1 reel upgrade symbol is replaced by a jackpot upgrade symbol. Similarly, if an SC_P2 reel upgrade symbol lands of third reel strip 406, the SC_P2 reel upgrade symbol is replaced by a jackpot upgrade symbol, and if an SC_P3 reel upgrade symbol lands of third reel strip 406, the SC_P3 reel upgrade symbol is replaced by a jackpot upgrade symbol. Thus, a "reel upgrade" is also performed on third reel strip 406 when a reel upgrade symbol lands thereon. In at least some embodiments, and as described herein, an up arrow symbol may be temporarily displayed on a reel strip while it is being upgraded with one or more jackpot upgrade symbols.

Once jackpot upgrade symbols have been added to third reel strip 406 and fifth reel strip 410, as described above, processor 204 may stop fourth reel strip 408 and fifth reel strip 410 (step 320). In addition, if at step 314, processor 204 determines that no reel upgrade symbols have landed on third reel strip 406, processor 204 may simply stop fourth reel strip 408 and fifth reel strip 410 without adding jackpot upgrade symbols to third reel strip 406 and/or fifth reel strip 410.

Next, processor 204 may evaluate the displayed symbol combination from each of the plurality of reel strips 402-410, including any added jackpot upgrade symbols, to determine whether a threshold number of jackpot upgrade symbols are displayed (step 322). In the exemplary embodiment, the threshold number of jackpot upgrade symbols is three jackpot upgrade symbols. Accordingly, if at least three jackpot upgrade symbols are displayed, processor 204 may trigger a jackpot feature, such as a wheel-based progressive jackpot feature, a tier-based progressive jackpot feature, and the like (step 324).

On the other hand, if fewer than three jackpot upgrade symbols are displayed, processor 204 may simply evaluate the symbols displayed from each of reel strips 402-410 to arrive at a game outcome (step 326). If the game outcome is associated with a bonus game award (as provided by a bonus game paytable), the player may be provided a corresponding bonus game award. If the player is not entitled to a bonus game award, no award is provided. Finally, processor 304 may determine whether the player has any free spins remaining. If so, gameplay returns to step 302, and reel strips 402-410 are re-spun. If not, the bonus game ends, and the player is returned to the primary game, or gameplay is terminated.

With reference to FIG. 5, a reel upgrade to third reel strip 406 is illustrated. In particular, a reel upgrade symbol 518 is displayed at symbol display position "2A" from first reel strip 402 (or column 508). As described above, reel upgrade symbol 518 corresponds to one of an SC_P1, SC_P2, or SC_P3 symbol from first reel strip 402. The precise reel upgrade symbol is not, in the exemplary embodiment, specified for or made visible to the player; however, other embodiments may specify or make visible the precise reel upgrade symbol that has landed.

Further, as described above, the occurrence of reel upgrade symbol 518 at symbol display position "2A" on first reel strip 402 (or column 508) may trigger replacement of one or more replaceable symbols on third reel strip 406 (or column 512). As described herein, replaceable symbols may not be indicated as replaceable symbols from a player perspective; rather, replaceable symbols may look like regular symbols to the player. An up arrow symbol 520 (e.g., an arrow animation) may be provided on third reel strip 406 (or column 512) to notify the player that one or more symbols on third reel strip 406 are being replaced with a jackpot upgrade symbol as well as to draw the player's attention to third reel strip 406 (or column 512).

Figure 6:
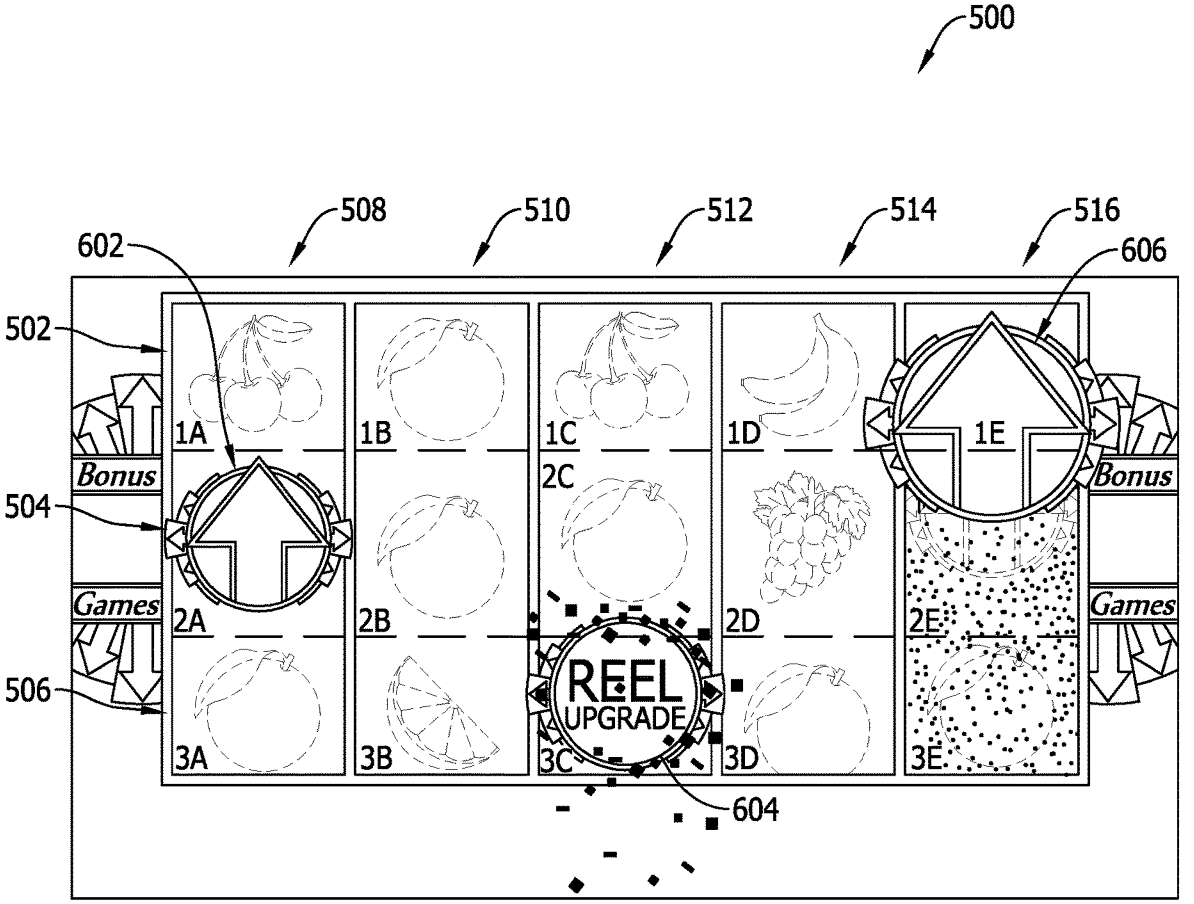
FIG. 6 is a schematic diagram of an exemplary game display of the EGMs shown in FIGS. 1 and 2 during the bonus game described at FIG. 3, and illustrating the occurrence of a second reel upgrade.

With reference to FIG. 6, as described in detail above, reel upgrade symbol 518 at symbol display position "2A" may also be replaced by a jackpot upgrade symbol. An up arrow symbol 602 (e.g., an arrow animation) may be provided on first reel strip 402 (or column 508) to notify the player that upgrade symbol 518 on first reel strip 402 is being replaced with a jackpot upgrade symbol.

In addition, a reel upgrade symbol 604 is displayed on third reel strip 406 (or column 512) at symbol display position "3C" from third reel strip 406. As described above, reel upgrade symbol 604 corresponds to one of an SC_P1, SC_P2, or SC_P3 symbol from third reel strip 406. In addition, and as above, the precise reel upgrade symbol is not, in the exemplary embodiment, specified for the player; however, other embodiments may specify the precise reel upgrade symbol that has landed.

Further, the occurrence of reel upgrade symbol 604 at symbol display position "3C" on third reel strip 406 may trigger replacement of one or more replaceable symbols on fifth reel strip 410 (or column 516)). An up arrow symbol 606 (e.g., an arrow animation) may be provided on fifth reel strip 410 (or column 516) to notify the player that one or more replaceable symbols on fifth reel strip 410 are being replaced with a jackpot upgrade symbol as well as to draw the player's attention to fifth reel strip 410 (or column 516). Moreover, reel upgrade symbol 604 at symbol display position "3C" may as described herein, also be replaced by a jackpot upgrade symbol. An animation (not shown) may be provided on third reel strip 406 (or column 516) to notify the player that reel upgrade symbol 604 is being replaced with a jackpot upgrade symbol.

Figure 7:
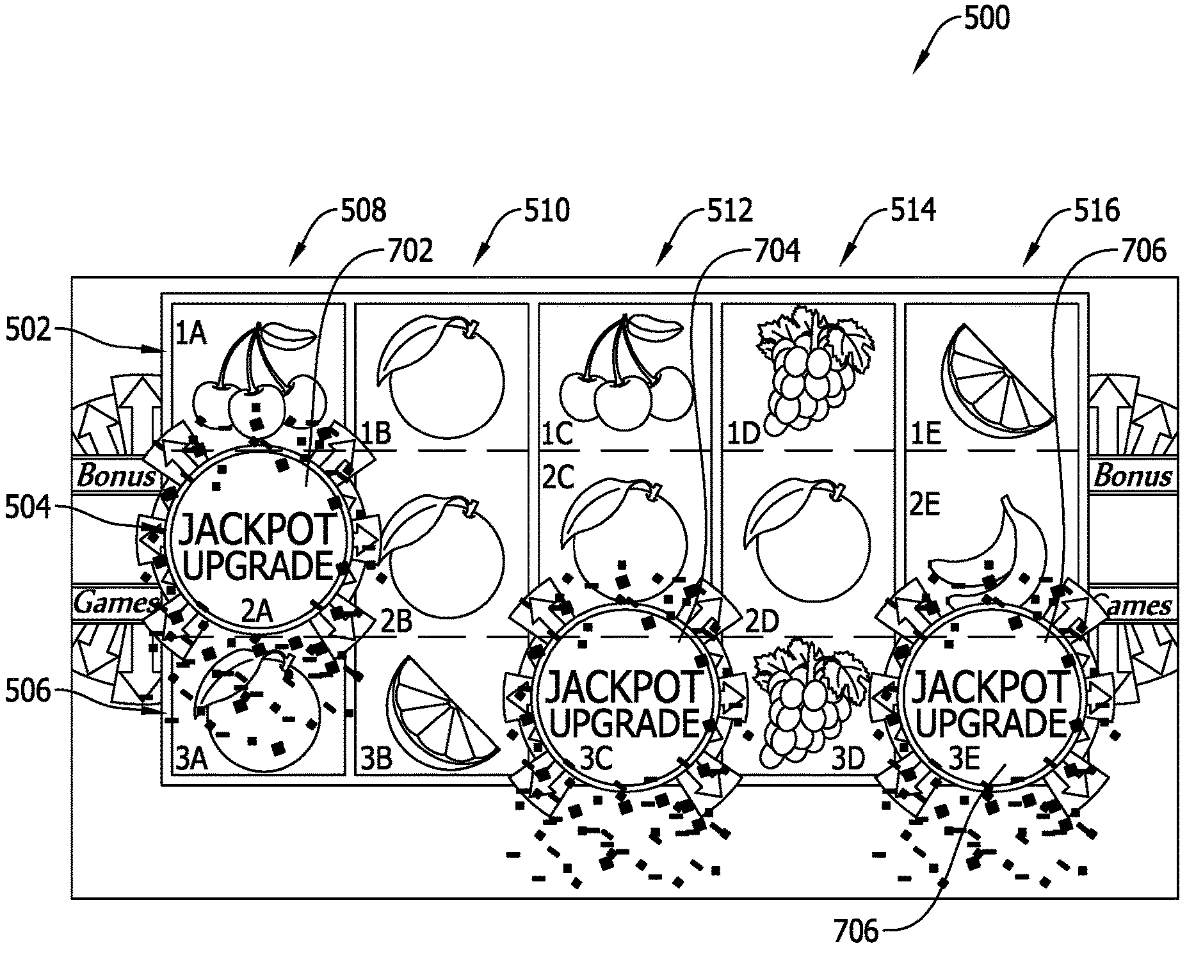
FIG. 7 is a schematic diagram of an exemplary game display of the EGMs shown in FIGS. 1 and 2 during the bonus game described at FIG. 3, and illustrating a jackpot trigger condition based on the reel upgrades shown at FIG. 5 and FIG. 6.

FIG. 7 is a schematic diagram illustrating a jackpot trigger condition based on the reel upgrades shown at FIGS. 5 and 6. Specifically, as described above, jackpot upgrade symbols 702 and 704 have been added, as shown, to symbol display positions "2A" and "3C," respectively. In addition, a jackpot upgrade symbol 706 is added to fifth reel strip 410 at symbol display position "3E" as a result of the occurrence of reel upgrade symbol 604 at symbol display position "3C" (described above). Accordingly, in the gameplay example illustrated at FIGS. 5-7, three jackpot upgrade symbols are displayed, and the bonus game proceeds to a jackpot feature, such as a wheel-based progressive jackpot feature, a tier-based progressive jackpot feature, and the like.

In summary, and with reference to FIG. 5, processor 204 stops and analyzes first reel strip 402 in column 508 to determine if any reel upgrade symbols have landed on column 508 from first reel strip 402. As shown, a reel upgrade symbol 518 (e.g., an SC_P1, SC_P2, or SC_P3 symbol) has landed on column 508. In response, processor 204 replaces all of the replaceable symbols (e.g., STAK1, STAK2, or STAK3 symbols) on third reel strip 406 corresponding to the reel upgrade symbol 518 with jackpot upgrade symbols. An up arrow symbol 520 is displayed on column 512 to indicate that processor 204 is replacing these replaceable symbols on third reel strip 406 with jackpot upgrade symbols; however, at this stage of gameplay, the jackpot upgrade symbols are not yet visible to the player. Moreover, as described above, the replaceable symbols may look like regular symbols to the player, such that the player cannot tell which symbols are actually being replaced by jackpot upgrade symbols.

Next, as shown at FIG. 6, processor 204 adds an up arrow symbol 602 to column 508 to indicate that the reel upgrade symbol 518 that previously landed on column 508 is also being replaced on first reel strip 402 by a jackpot upgrade symbol. Here again, the jackpot upgrade symbol that is added to first reel strip 402 is not yet displayed for the player. In addition, and at the same time, processor 204 stops and analyzes third reel strip 406 in column 512 to determine if any reel upgrade symbols have landed on column 512 from third reel strip 406. As shown, a reel upgrade symbol 604 has landed on column 512. In response, processor 204 replaces all of the replaceable symbols on fifth reel strip 410 corresponding to the reel upgrade symbol 604 with jackpot upgrade symbols. An up arrow symbol 606 is displayed on column 516 to indicate that processor 204 is replacing these replaceable symbols on fifth reel strip 410 with jackpot upgrade symbols; however, at this stage of gameplay, the jackpot upgrade symbols are not yet visible to the player. Moreover, as described above, the replaceable symbols may look like regular symbols to the player, such that the player cannot tell which symbols are actually being replaced by jackpot upgrade symbols.

Finally, and as shown with reference to FIG. 7, processor 204 stops fifth reel strip 410 in column 516 and reveals the jackpot upgrade symbols 702, 704, and 706 added to first reel strip 402, third reel strip 406, and fifth reel strip 516, respectively. Note also that second reel strip 404 and fourth reel strip 408 (which are not modified with jackpot upgrade symbols) may stop at any time, such as, for example, and in the exemplary embodiment, after the reel strip to the left of each has stopped. Having stopped all reel strips 402-410 and displayed the three jackpot upgrade symbols 702, 704, and 706, processor 204 evaluates the symbol combination shown in columns 508-516 and determines, in the example shown, that at least three jackpot upgrade symbols are displayed. In response, processor 204 triggers a jackpot game, such as a wheel-based jackpot game. In other embodiments, processor 204 simply awards a jackpot.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one memory with instructions stored thereon; and at least one processor in communication with the at least one memory, wherein the instructions, when executed by the at least one processor, cause the at least one processor to:

cause display of a plurality of reel strips as spinning for an electronic game, the plurality of reel strips comprising a first reel strip, a second reel strip, a third reel strip, a fourth reel strip, and a fifth reel strip;

cause display of a first plurality of symbols by causing the first reel strip to stop spinning;

replace at least one symbol on the third reel strip with at least one upgrade symbol in response to the first plurality of symbols including a trigger symbol;

cause display of a second plurality of symbols by causing the second reel strip to stop spinning;

cause display of a third plurality of symbols by causing the third reel strip to stop spinning;

replace at least one symbol on the fifth reel strip with another at least one upgrade symbol in response to the third plurality of symbols including another trigger symbol;

cause display of a fourth plurality of symbols by causing the fourth reel strip to stop spinning; and cause display of a fifth plurality of symbols by causing the fifth reel strip to stop spinning.

2. The electronic gaming device of claim 1, wherein the instructions further cause the at least one processor to:

determine a first identifier stored in the at least one memory as being associated with the at least one upgrade symbol;

determine that the third reel strip comprises at least one replaceable symbol associated with the first identifier in the at least one memory; and cause the at least one replaceable symbol to be replaced with the at least one upgrade symbol based on the association.

3. The electronic gaming device of claim 1, wherein the instructions further cause the at least one processor to provide the electronic game based on at least one message received from a gaming server.

4. The electronic gaming device of claim 1, wherein the electronic gaming device comprises at least one of a portable gaming device or a remote gaming device.

5. The electronic gaming device of claim 1, wherein the trigger symbol and the another trigger symbol are the same trigger symbol.

6. The electronic gaming device of claim 1, wherein the trigger symbol and the another trigger symbol are different trigger symbols.

7. The electronic gaming device of claim 1, wherein the at least one upgrade symbol and the another at least one upgrade symbol are the same at least one upgrade symbol.

8. The electronic gaming device of claim 1, wherein the at least one upgrade symbol and the another at least one upgrade symbol are different at least one upgrade symbols.

9. At least one non-transitory computer-readable storage medium with instructions stored thereon that, in response to execution by at least one processor, cause the at least one processor to:

cause a plurality of reel strips to be displayed as spinning for an electronic game, the plurality of reel strips comprising a first reel strip, a second reel strip, a third reel strip, a fourth reel strip, and a fifth reel strip;

cause a first plurality of symbols to be displayed by causing the first reel strip to stop spinning;

cause at least one symbol on the third reel strip to be replaced with at least one upgrade symbol in response to the first plurality of symbols including a trigger symbol;

cause a second plurality of symbols to be displayed by causing the second reel strip to stop spinning;

cause a third plurality of symbols to be displayed by causing the third reel strip to stop spinning;

cause at least one symbol on the fifth reel strip to be replaced with another at least one upgrade symbol in response to the third plurality of symbols including another trigger symbol;

cause a fourth plurality of symbols to be displayed by causing the fourth reel strip to stop spinning; and cause a fifth plurality of symbols to be displayed by causing the fifth reel strip to stop spinning.

10. The at least one non-transitory computer-readable storage medium of claim 9, wherein the instructions further cause the at least one processor to:

determine a first identifier stored in the at least one non-transitory computer-readable storage medium as being associated with the at least one upgrade symbol;

determine that the third reel strip comprises at least one replaceable symbol associated with the first identifier in the at least one non-transitory computer-readable storage medium; and cause the at least one replaceable symbol to be replaced with the at least one upgrade symbol based on the association.

11. The at least one non-transitory computer-readable storage medium of claim 9, wherein the instructions further cause the at least one processor to cause the electronic game to be provided at an electronic gaming device by transmitting one or more messages to the electronic gaming device where the electronic game displayed.

12. The at least one non-transitory computer-readable storage medium of claim 11, wherein the electronic gaming device comprises at least one of a portable gaming device or a remote gaming device.

13. The at least one non-transitory computer-readable storage medium of claim 9, wherein the trigger symbol and the another trigger symbol are the same trigger symbol.

14. The at least one non-transitory computer-readable storage medium of claim 9, wherein the trigger symbol and the another trigger symbol are different trigger symbols.

15. The at least one non-transitory computer-readable storage medium of claim 9, wherein the at least one upgrade symbol and the another at least one upgrade symbol are the same at least one upgrade symbol.

16. The at least one non-transitory computer-readable storage medium of claim 9, wherein the at least one upgrade symbol and the another at least one upgrade symbol are different at least one upgrade symbols.

17. A method of electronic gaming implemented by at least one processor in communication with at least one memory, the method comprising:

causing display of a plurality of reel strips as spinning for an electronic game, the plurality of reel strips comprising a first reel strip, a second reel strip, a third reel strip, a fourth reel strip, and a fifth reel strip;

causing display of a first plurality of symbols by causing the first reel strip to stop spinning;

replacing at least one symbol on the third reel strip with at least one upgrade symbol in response to the first plurality of symbols including a trigger symbol;

causing display of a second plurality of symbols by causing the second reel strip to stop spinning;

causing display of a third plurality of symbols by causing the third reel strip to stop spinning;

replacing at least one symbol on the fifth reel strip with another at least one upgrade symbol in response to the third plurality of symbols including another trigger symbol;

causing display of a fourth plurality of symbols by causing the fourth reel strip to stop spinning; and causing display of a fifth plurality of symbols by causing the fifth reel strip to stop spinning.

18. The method of claim 17, further comprising causing the electronic game to be provided based on at least one message received from a server.

19. The method of claim 17, further comprising causing the electronic game to be provided at an electronic gaming device by transmitting one or more messages to the electronic gaming device where the electronic game is displayed.

20. The method of claim 19, wherein the electronic gaming device comprises at least one of a portable gaming device or a remote gaming device.

* * * * *